United States Patent [19]
Lak et al.

[11] Patent Number: 6,151,900
[45] Date of Patent: Nov. 28, 2000

[54] CRYOGENIC DENSIFICATION THROUGH INTRODUCTION OF A SECOND CRYOGENIC FLUID

[75] Inventors: Tibor I Lak, Huntington Beach; Gene Rogers, San Pedro; James F. Weber, Moorpark; Michael V. Merlin, Anaheim; Timothy L. Gaynor, III, Cypress; John E. Davis, Claremont; David L. Gerhardt, Redondo Beach, all of Calif.

[73] Assignee: Boeing Northamerican, Inc., Seal Beach, Calif.

[21] Appl. No.: 09/262,754

[22] Filed: Mar. 4, 1999

[51] Int. Cl.[7] .............................. F17C 11/00; F17C 5/02; F25B 19/00
[52] U.S. Cl. ................................. 62/46.1; 62/47.1; 62/7
[58] Field of Search ................... 62/51.1, 48.3, 62/49.1, 46.1, 7, 47.1

[56] References Cited

U.S. PATENT DOCUMENTS

| | | |
|---|---|---|
| 2,640,627 | 6/1953 | Doelter . |
| 3,389,555 | 6/1968 | Goldstein et al. . |
| 3,861,160 | 1/1975 | Walker ..................................... 62/46.1 |
| 4,510,771 | 4/1985 | Matsuda et al. ......................... 62/51.1 |
| 5,315,530 | 5/1994 | Gerhardt et al. . |
| 5,398,515 | 3/1995 | Lak . |
| 5,644,920 | 7/1997 | Lak et al. . |
| 5,778,678 | 7/1998 | Lee ........................................... 62/46.1 |
| 5,806,318 | 9/1998 | Dilorio et al. ........................... 62/46.1 |
| 5,861,574 | 1/1999 | Kotani et al. ........................... 174/15.4 |
| 5,964,094 | 10/1999 | Butler et al. .............................. 62/46.1 |

*Primary Examiner*—William Doerrler
*Attorney, Agent, or Firm*—Stout, Uxa, Buyan & Mullins, LLP; Donald E. Stout

[57] ABSTRACT

A system and method for cooling a first cryogenic liquid in a vessel comprises the steps of directing a second cryogenic into the first cryogenic fluid and releasing gas from the vessel. The first cryogenic fluid has a boiling point that is higher than the boiling point of the second cryogenic fluid. Directing the second cryogenic fluid into the first cryogenic fluid results in the second fluid cooling the first fluid and the second fluid vaporizing. The vaporized fluid is released as a gas from the vessel. The vessel may be a propellant tank for a space vehicle. The first and second cryogenic fluids are delivered from supplies located outside of the vehicle. The first cryogenic liquid may be oxygen and the second cryogenic liquid may be nitrogen, neon, or helium. In another aspect of the invention, the first cryogenic liquid may be hydrogen and the second cryogenic liquid may be helium.

25 Claims, 1 Drawing Sheet

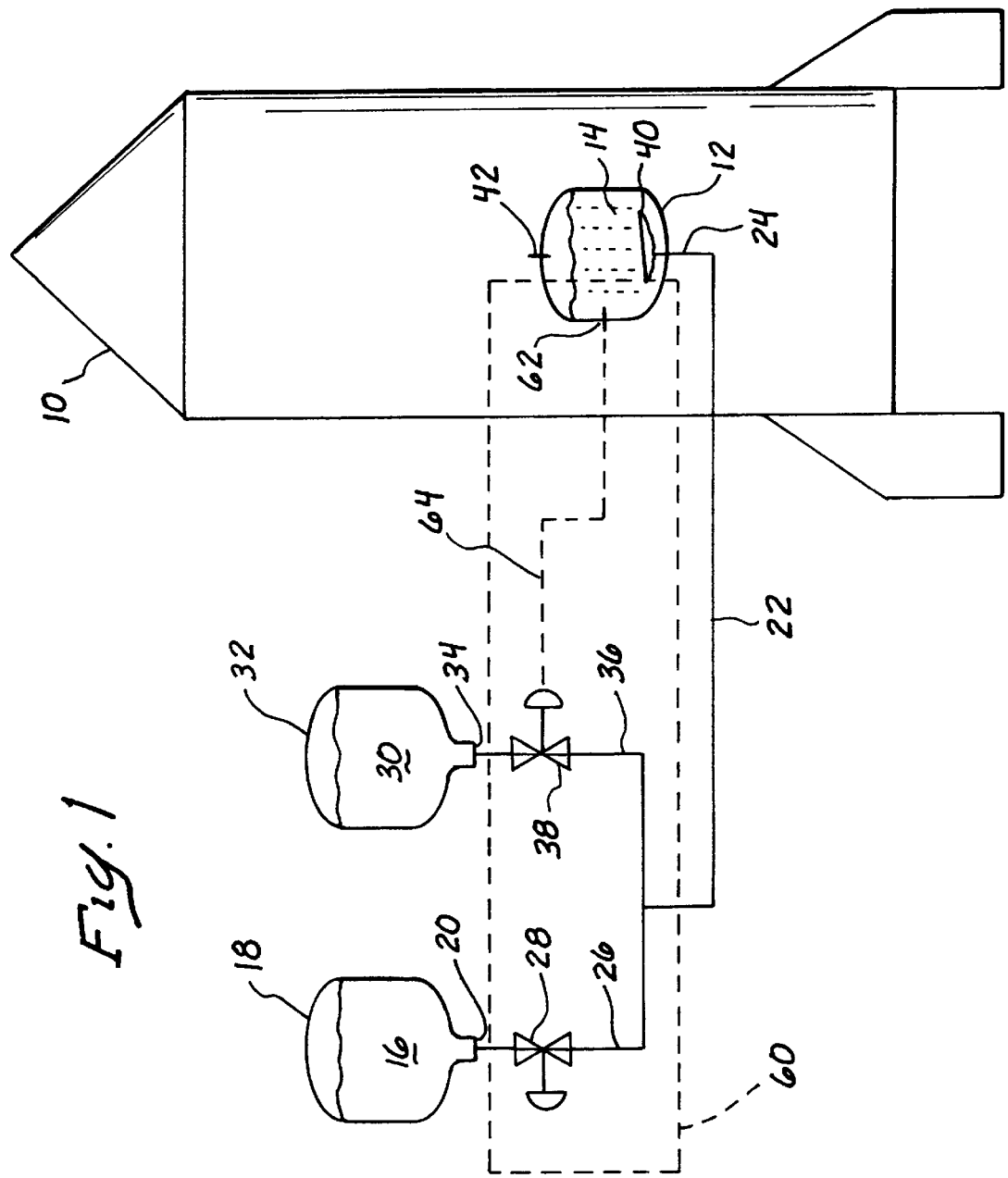

CRYOGENIC DENSIFICATION THROUGH INTRODUCTION OF A SECOND CRYOGENIC FLUID

BACKGROUND OF THE INVENTION

1. Field of the Invention

This invention relates to cryogenic liquid propellant and, more specifically, to cooling the cryogenic liquid propellant.

2. Description of the Related Art

Propulsion systems utilizing cryogenic liquid oxygen and/or hydrogen, such as the Space Shuttle, Atlas/Centaur, Delta, etc., are currently filled from the facility storage tanks and subsequently allowed to cool in the flight tanks in order to reject the heat absorbed by the liquid as a result of environmental heat leak, transfer line, and tank wall chilldown. The cooling of the liquid bulk is desirable in order to increase the liquid density so that more impulse mass can be stored in the tank, and also to reduce the liquid vapor pressure so that the tank operating pressure and tank weight is minimized.

The need to reduce the weight of the propulsion systems is recognized in the art. The lighter the craft, the more efficiently it may travel. The current systems for cooling the cryogenic liquid fuels add weight to the craft. A need also exists for simple, robust systems and methods to perform the cooling function. The simpler and the more robust the cooling system, the less opportunity for problems to arise during operation.

Therefore, a need exists to provide a cryogenic liquid cooling system that is simple, robust, and with a reduced weight.

SUMMARY OF THE INVENTION

In an aspect of the invention, a method for cooling a first cryogenic fluid in a vessel comprises the steps of directing a second cryogenic into the first cryogenic fluid and releasing gas from the vessel. The first cryogenic fluid has a boiling point that is higher than the boiling point of the second cryogenic fluid. Directing the second cryogenic fluid into the first cryogenic fluid results in the second fluid cooling the first fluid and the second fluid vaporizing. The vaporized fluid is released as a gas from the vessel.

In an aspect of the invention, the flow of the second cryogenic fluid into the vessel may be arrested when the temperature of the first cryogenic fluid reaches a predetermined temperature. In a further aspect of the invention, the predetermined temperature is the second cryogenic fluid boiling point.

In an aspect of the invention, a predetermined amount of the first cryogenic fluid is directed into the vessel and a predetermined amount of the second cryogenic fluid is direct into the vessel.

In an aspect of the invention, the second cryogenic fluid may be directed into the vessel through a diff-user located in the bottom of the vessel.

In an aspect of the invention, the first cryogenic fluid is oxygen and the second cryogenic fluid is nitrogen, neon, or helium. In another aspect of the invention, the first cryogenic fluid is hydrogen and the second cryogenic fluid is helium.

In an aspect of the invention, the vessel is in a vehicle. In a further aspect of the invention, the vehicle is capable of flight.

In an aspect of the invention, a cryogenic fluid cooling system comprises a cryogenic fluid holding vessel, first and second cryogenic fluid supplies, a cryogenic fluid feed line, and a fluid flow control system. The cryogenic fluid holding vessel comprises a cryogenic fluid inlet and a gas release outlet. The cryogenic fluid feed line comprises an outlet connected to the cryogenic fluid holding vessel inlet and an inlet connected to the first and second cryogenic fluid supplies. The fluid flow control system is functionally connected to the first and second cryogenic fluid supplies.

In a further aspect of the invention, a first cryogenic fluid delivery line connects the cryogenic fluid feed line inlet to an outlet of the first cryogenic fluid supply. Also, a second cryogenic fluid delivery line connects the cryogenic fluid feed line inlet to an outlet of the second cryogenic fluid supply. Further, the fluid flow control system comprises a first valve in the first cryogenic fluid delivery line and a second valve in the second cryogenic fluid delivery line.

In an aspect of the invention, the fluid flow control system comprises measuring means for delivering a predetermined amount of the first flow into the cryogenic fluid holding vessel and then a predetermined amount of the second flow into the cryogenic fluid holding vessel. In further aspects of the invention, the measuring means may comprise a mass flow measuring system or a volumetric flow measuring system. In another aspect of the invention, a temperature controller may close the second valve when the fluid temperature of material in the cryogenic fluid holding vessel reaches a predetermined temperature. The temperature controller may comprise a temperature indicator that is functionally interfaced with the cryogenic holding vessel to determine, either directly or indirectly, the fluid temperature.

In an aspect of the invention, the first and second cryogenic fluid supplies are located outside of the vehicle and the first and second cryogenic fluid delivery lines are located outside of the vehicle.

BRIEF DESCRIPTION OF THE DRAWING

FIG. 1 schematically shows a cryogenic fluid cooling and densification system according to an embodiment of the invention.

DESCRIPTION OF THE PREFERRED EMBODIMENTS

Referring now to the figures, wherein like reference numerals refer to like elements throughout the figures, and referring specifically to FIG. 1, a space vehicle 10 contains a cryogenic fluid holding vessel 12. The vessel 12 may hold cryogenic fluid 14 for any suitable purpose, such as for fueling the vehicle 10. The invention comprises introducing a second cryogenic fluid 30 into the cryogenic fluid 14 to cool and density the cryogenic fluid 14.

In the shown embodiment of the invention, the cryogenic fluid 14 in the vessel 12 is predominately a first cryogenic fluid 16 from a first cryogenic fluid supply 18, as is described below. The first cryogenic fluid supply 18 is located outside the vehicle 10 in the shown, and preferred, embodiment of the invention. The first cryogenic fluid 16 is directed out of the supply 18 through a supply outlet 20, through a feed line 22, and to a vessel inlet 24 wherein the fluid 16 enters the vessel 12. More specifically, in the shown embodiment of the invention, the fluid 16 is directed through the supply outlet 20, into a first delivery line 26 that has valve 28 in it, and into the feed line 22.

In the shown embodiment of the invention, a second cryogenic fluid 30 in a second cryogenic fluid supply 32 is directed to the vessel 12 after the first cryogenic fluid 16 has been directed into the vessel. The second cryogenic fluid supply 32 is located outside the vehicle 10 in the shown, and preferred, embodiment of the invention. The second cryogenic fluid 30 is directed out of the supply 32 through a supply outlet 34, through the feed line 22, and to the vessel inlet 24 wherein the fluid 30 enters the vessel 12. More specifically, in the shown embodiment of the invention, the fluid 30 is directed through the supply outlet 34, into a second delivery line 36 that has a valve 38 in it, and into the feed line 22.

The second cryogenic fluid 30 cools the first cryogenic fluid 16 that has been directed into the vessel 12. The first cryogenic fluid 16 has a higher boiling point than the second cryogenic fluid 30. This results in the temperature of the first cryogenic fluid 16 being higher than the temperature of the second cryogenic fluid 30. As the second cryogenic fluid 30 enters the vessel 12, it cools the first cryogenic fluid 16 in the vessel.

In a preferred embodiment of the invention, the cryogenic fluids 16 and 30 are mutually and essentially non-dissolvable. However, in the preferred embodiment of the invention, some dissolution of the second cryogenic fluid 30 into the first cryogenic fluid may occur, resulting in the vessel cryogenic fluid 14 being predominately, but may not be wholly, the first cryogenic fluid 16.

As the second cryogenic fluid 30 cools the vessel cryogenic fluid 14, a portion of the second cryogenic fluid vaporizes and exits the vessel through a gas release outlet 42 at the top of the vessel. In a preferred embodiment of the invention in which the cryogenic fluids are mutually and essentially non-dissolvable, substantially all of the second cryogenic fluid 30 directed into the vessel 12 vaporizes. The latent heat of vaporization and the sensible heat from the second cryogenic fluid 30 cools the cryogenic fluid 14 in the vessel 12.

In a preferred embodiment of the invention, the first cryogenic fluid 18 is hydrogen and the second cryogenic fluid 30 is helium. In a more preferred embodiment of the invention, the first cryogenic fluid 18 is oxygen and the second cryogenic fluid 30 is nitrogen, neon, or helium.

In the shown embodiment of the invention, a diffuser 40 is connected to the vessel inlet 22 and located in the bottom of the vessel to assist in distributing the second cryogenic fluid 30 into the vessel cryogenic fluid 14. Embodiments of the invention comprise any devices that direct the second cryogenic fluid 30 into and about the vessel, including orifices, jets, diffusers, distributors, bubblers, manifolds, baffles and other devices. In preferred embodiments of the invention, the second cryogenic fluid 30 enters into the vessel 12 through the bottom of the vessel. Other embodiments of the invention may have the second cryogenic fluid 30 entering the vessel through a portion other than the bottom.

In a preferred embodiment of the invention, a fluid flow control system 60 directs the flow of first and second cryogenic fluids 16 and 30 into the vessel 12. The control system 60 comprises the valves 28 and 38 and a temperature indicator 62. The temperature indicator 62 is mounted to the vessel 12 to measure the temperature of the vessel cryogenic fluid 14. The temperature indicator 62 sends a signal 64 to the second valve 38. The valve 38 closes when the temperature of the vessel cryogenic fluid 14 reaches a predetermined temperature. In a preferred embodiment of the invention, the predetermined temperature is the boiling point of the second cryogenic fluid 30. Other embodiments of the invention may have higher predetermined temperatures.

In the shown embodiment of the invention, the temperature indicator 62 is mounted to the vessel 12 to measure the temperature of the vessel cryogenic fluid 14. Other embodiments may have any other suitable temperature indicator to determine the temperature, either directly or indirectly, of the vessel cryogenic fluid 14. These other embodiments may include methods and devices of determining the temperature of the vessel cryogenic fluid 14 through approximation techniques.

In another embodiment of the invention, a predetermined volume of the second fluid 30 is directed to the vessel 12. The predetermined volume required to cool the vessel cryogenic fluid 14 may be determined using techniques known to those in the art based on the properties and temperatures of the first and second cryogenic fluids 16 and 30, and the properties of the equipment used to deliver and store the fluids. The measuring of the volume of the second cryogenic fluid may comprise mass flow meters, volumetric flow meters, or any other suitable metering systems. These measuring systems would be incorporated into the fluid flow control system of an embodiment of the invention.

Other embodiments of the invention may use other types of fluid flow control systems to direct and measure the first and second cryogenic fluid flows into the vessel 12, some of which are describe below. The amount of the first cryogenic fluid 16 directed to the vessel may be controlled by a fluid level indicator in the vessel that sends a signal to close the first valve 28 when a predetermined level of fluid is reached in the vessel. The vessel 12 may be on load cells that send a signal to close the first valve 28 with a predetermined weight of the first cryogenic fluid has been delivered to the vessel. Load cells may be mounted to the first cryogenic fluid supply 18 that send a signal to close the first valve 28 when a predetermined amount of the first cryogenic fluid 16 has left the supply.

The control of the flow of the first cryogenic fluid 16 from the supply 18 may also be controlled by mass flow meters or volumetric flow meters. The signals and the controller portion of the fluid flow control system may comprise electronic equipment, relays, pneumatics equipment, computers, and other controllers known in the art.

In an embodiment of the invention, the first and second cryogenic fluids 16 and 30 may be delivered to the vessel in separate lines, although this may add undesirable weight the vehicle 10. In a further embodiment of the invention, at least portions of the two cryogenic fluids 16 and 30 may be directed to the vessel 12 concurrently.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method for cooling a first cryogenic fluid in a vessel, the first cryogenic fluid having a boiling point, the method comprising the steps of:

a. directing a second cryogenic fluid into the first cryogenic fluid, wherein the second cryogenic fluid has a boiling point that is lower than the first cryogenic fluid boiling point, whereby the first cryogenic fluid is cooled and a portion of the second cryogenic fluid becomes a gas; and b. releasing the gas from the vessel.

2. The method of claim 1, further comprising the steps of:
   a. measuring the temperature of the first cryogenic fluid; and
   b. arresting the directing step when the first cryogenic fluid has reached a predetermined temperature.

3. The method of claim 2, wherein the predetermined temperature is approximately the second cryogenic fluid boiling point.

4. The method of claim 1:
   a. further comprising the step of directing a predetermined amount of the first cryogenic fluid into the vessel;
   b. wherein the directing the second cryogenic fluid step further comprises the step of directing a predetermined amount of the second cryogenic fluid into the vessel.

5. The method of claim 1, wherein the directing step further comprises the step of directing the second cryogenic fluid into a diffuser disposed in a lower portion of the vessel.

6. The method of claim 5, further comprising the step of directing the first cryogenic fluid into the vessel through the diffuser.

7. The method of claim 1, wherein the first cryogenic fluid is oxygen and the second cryogenic fluid is nitrogen, neon, or helium.

8. The method of claim 1, wherein the first cryogenic fluid is hydrogen and the second cryogenic fluid is helium.

9. The method of claim 1, wherein the vessel is in a vehicle.

10. The method of claim 1, wherein the vessel is in a vehicle capable of flight.

11. A cryogenic fluid cooling system comprising:
    a. a cryogenic fluid holding vessel comprising a cryogenic fluid inlet and a gas release outlet;
    b. first and second cryogenic fluid supplies;
    c. a cryogenic fluid feed line comprising an outlet connected to the cryogenic fluid holding vessel inlet and an inlet connected to the first and second cryogenic fluid supplies; and
    d. a fluid flow control system functionally connected to the first and second cryogenic fluid supplies.

12. The system of claim 11, further comprising:
    a. a first cryogenic fluid delivery line connecting the cryogenic fluid feed line inlet to an outlet of the first cryogenic fluid supply;
    b. a second cryogenic fluid delivery line connecting the cryogenic fluid feed line inlet to an outlet of the second cryogenic fluid supply;
    c. wherein the fluid flow control system comprises a first valve in the first cryogenic fluid delivery line and a second valve in the second cryogenic fluid delivery line.

13. The system of claim 12, wherein the fluid flow control system comprises measuring means for delivering a predetermined amount of the first flow into the cryogenic fluid holding vessel and then a predetermined amount of the second flow into the cryogenic fluid holding vessel.

14. The system of claim 13, wherein the measuring means comprises a mass flow measuring system or a volumetric flow measuring system.

15. The system of claim 12, wherein the fluid flow control system comprises:
    a temperature controller that closes the second valve when the fluid temperature of material in the cryogenic fluid holding vessel reaches a predetermined temperature, the temperature controller comprising a temperature indicator functionally interfaced with the cryogenic holding vessel to determine, either directly or indirectly, the fluid temperature.

16. The system of claim 15, wherein the predetermined temperature is approximately a boiling point of a cryogenic fluid in the second cryogenic fluid supply.

17. The system of claim 12, further comprising a diffuser in the cryogenic fluid holding vessel, the diffuser comprising a diffuser inlet connected to the cryogenic fluid feed line outlet.

18. The system of claim 12, wherein fluid oxygen is in the first cryogenic fluid supply and fluid nitrogen, neon, or helium is in the second cryogenic fluid supply.

19. The system of claim 12, wherein fluid hydrogen is in the first cryogenic fluid supply and fluid helium is in the second cryogenic fluid supply.

20. The system of claim 12, wherein the cryogenic fluid holding vessel is in a vehicle.

21. The system of claim 19, wherein the vehicle is capable of flight.

22. The system of claim 20, wherein the first and second cryogenic fluid supplies are located outside of the vehicle.

23. The system of claim 21, wherein the first and second cryogenic fluid delivery lines are located outside of the vehicle.

24. A cryogenic fluid cooling system, comprising:
    a cryogenic fluid holding vessel comprising a cryogenic fluid inlet and a gas release outlet;
    a first cryogenic fluid having a boiling point and being disposed in said vessel;
    a second cryogenic fluid having a boiling point which is lower than the boiling point of said first cryogenic fluid, the second cryogenic fluid being disposed in a second cryogenic fluid supply; and
    a cryogenic fluid feed line comprising an outlet connected to the cryogenic fluid holding vessel inlet and an inlet connected to the second cryogenic fluid supply, wherein said cryogenic fluid holding vessel inlet is disposed on said vessel below a top surface of the first cryogenic fluid in said vessel.

25. A cryogenic fluid cooling system comprising:
    a cryogenic fluid holding vessel comprising a sole cryogenic fluid inlet and a gas release outlet;
    first and second cryogenic fluid supplies;
    a single cryogenic fluid feed line comprising an outlet connected to the cryogenic fluid holding vessel inlet and a single inlet connected to both of the first and second cryogenic fluid supplies; and
    a fluid flow control system functionally connected to the first and second cryogenic fluid supplies.

* * * * *